April 2, 1968  R. GAGNON  3,376,538

PORTABLE ELECTRIC WELDING DEVICE

Filed June 7, 1965

INVENTOR
ROBERT GAGNON

ATTORNEY

United States Patent Office 3,376,538
Patented Apr. 2, 1968

3,376,538
PORTABLE ELECTRIC WELDING DEVICE
Robert Gagnon, 3075 Leo Ave., Val Caron,
Ontario, Canada
Filed June 7, 1965, Ser. No. 462,034
1 Claim. (Cl. 338—231)

ABSTRACT OF THE DISCLOSURE

Portable arc welding apparatus readily carried around by hand to the location needed, the apparatus deriving its power by simply plugging into a conventional socket installed in the known electric system from which light and power are derived. The apparatus includes a liquid container or casing with an open top, the resistance elements being mounted on a skeleton frame and grid in the bottom of the casing submerged in a liquid bath. The resistance elements are connected in parallel and the welding circuit comprises a source of power, a positive wire connected to one end of an electrode or welding rod clamp and a negative wire and resistance elements connected in circuit therewith and with a lead wire connected to the other electrode or welding rod clamp. The open top of the casing is closed by cover means partly grilled and open for ventilation and partly imperforate dielectric for supporting fuses and electrode terminal posts.

Summary of the invention

Figure 1:
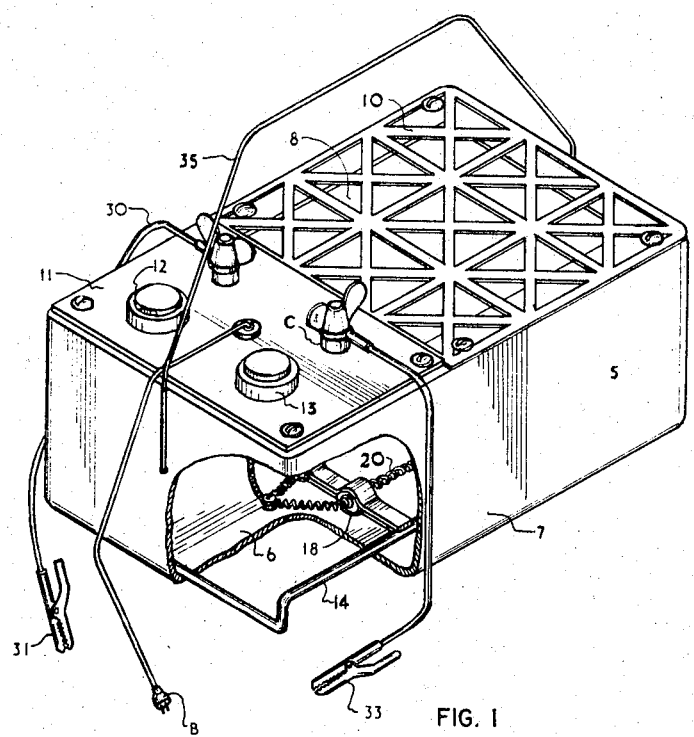

Portable arc welding apparatus including a casing open at the top with a pair of U-shaped resistance elements mounted on a grid in the casing and submerged in liquid. The resistance elements are connected in parallel to each other and connected at one end to a negative wire of the circuit and connected at the other end to a wire connected to a welding rod clamp. A positive wire of the circuit is connected at one end to the source of power and at the other end to a second welding rod clamp. The open top of the casing is closed by a cover partly perforated to cool the interior and partly imperforate to support fuses and the terminal parts.

This invention relates to a portable electric welding device.

In electric welding it is usual, and often necessary, to bring the parts to be welded to a shop equipped to carry out welding operations.

An object of the present invention is to provide a portable welding device which may be easily carried by hand to the location where the welding operation is to be carried out, with the welding device deriving its power by simply plugging into a conventional socket installed in the known electric system from which light and power are derived.

Another object of the invention is to enclose the resistance element, used in the assembly of the device, in a closed container which may also be utilized as a liquid bath in which the resistance elements are submerged.

A further object of this invention is to close part of the container with a perforated cover or grille which is readily removable for inspection or repair of the instrumentalities housed in the container, and to provide the remaining part of the container cover with a cover of insulating material designed to carry the fuses and other connecting means from which the resistance elements depend.

Further objects will be made clear as the specification develops.

The attached drawings illustrate my invention with the circuitry in diagrammatic form, but it will be understood that changes may be made in the assembly of the co-acting elements within the scope of my appended claim, without departing from the spirit of my invention.

Figure 2:
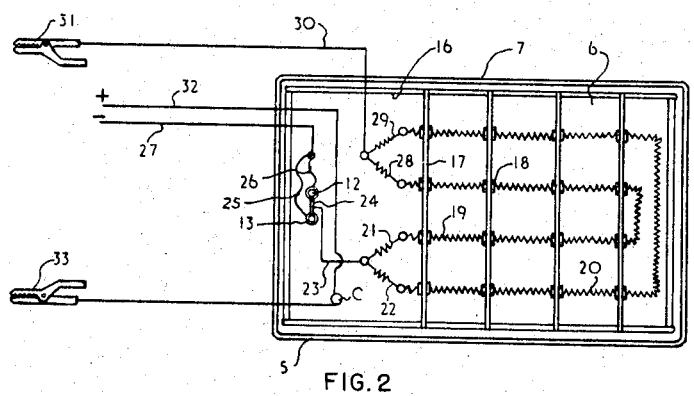

In the drawings:

FIGURE 1 is a perspective view of my compact portable unit with parts of the housing broken away to show the necessary fuses and connecting posts thereon, also the ventilating grille; and FIGURE 2 is a diagrammatic view of the electric circuit.

The several elements of construction are referred to by reference characters.

Referring to the drawings, 5 represents a container which may be of any geometrical form in horizontal section but in the embodiment illustrated it is of rectangular shape having a bottom 6 and side walls 7 and open top 8. Part of the open top is covered by an insulated ventilating grille 10 removably secured by screws to the side walls of the container. The remainder of the open top of the container 5 is closed by a removable cover 11 of dielectric or insulating material and this cover 11 carries a pair of spaced sockets 12 and 13 with which removable and renewable fuse plugs may be inserted.

In the bottom of the container 5 a skeleton frame 14 is rigidly mounted and this frame is formed of wire and is generally of rectangular shape, and on this frame a grid 15 of rectangular shape is mounted. This grid is formed of longitudinal strips 16 and transverse strips 17 of metal and the transverse strips are each formed with four equidistantly spaced orifices through which annular insulating rings 18 pass, and through these rings 18 a pair of spaced coiled inner and outer resistance elements 19 and 20 are threaded. Each resistance element 19 and 20 is substantially U-shaped so that the inner element 19 is embraced by the outer element 20 and lies within the area defined by such outer element 20.

One end of the element 19 is connected to a wire 21 and the adjacent end of the element 20 is connected to a wire 22 and these wires 21 and 22 converge and form a single lead-in wire 23 which is attached to the busbar 24 connecting the two spaced insulator sockets 12 and 13. The insulator sockets are connected by wires 25 and 26 with the wire 27 of the plug B which may be threaded into a standard socket of a commercial power line or source of electrical supply.

The other end of the resistance elements 19 and 20 are connected by the wires 28 and 29 which converge and constitute the wire 30 on the free end of which a spring clip 31 is secured. It will be clear that the sockets 12 and 13 are in parallel and the resistance elements 19 and 20 are likewise in parallel in the part of the electric circuit so far defined.

The second power wire 32 from the plug B is clamped intermediate of its length to the post C on the insulated cover 11 of the container 5 and the free end of this wire 32 is connected to a spring clip 33 and the spring clips 31 and 33 are designed to be clamped on the terminals of a conventional welding rod not shown. As the welding rod is of usual construction, it is not further described. When in use this welding rod provides the necessary welding arcs by means of which the welding operation is carried out.

To eliminate overheating of the resistance elements 19 and 20 in the container 5, fresh water is poured into the container to a depth which will effectively cover the elements and the grid 15 carrying the same, so that the container forms an effective water bath. When heavy welding is being performed, the water being used in the bath is desirably of a saline nature.

The container 5 is provided with a bail 35 which permits of the container being readily carried when transporting the welding apparatus to a job.

From the foregoing description taken in connection with the accompanying drawings, it will be manifest that a portable electric welding device is provided that will fulfill all the necessary requirements of such a device, but as many changes could be made in the above description and many apparently widely different embodiments of the invention may be constructed within the scope of the appended claim, without departing from the spirit or scope thereof, it is intended that all matters contained in the said accompanying specification and drawings shall be interpreted as illustrative and not in a limitative or restrictive sense.

What is claimed as new is:

1. For use with an electric welding electrode, a portable unit comprising a casing having a closed bottom and an open top adapted to contain a cooling liquid, a pair of electrical resistance elements located in the bottom of the casing, said resistance elements being U-shaped, one resistance element being disposed within the other resistance element, means electrically connecting the resistance elements in parallel circuit relation with one another, a pair of fuse sockets, means connecting the same in circuit relation with the resistance elements, circuit wire means common to both sockets, a plug electrically connected to an electric source, said wire means connected to said plug, the resistance elements being connected at the end remote from the sockets with a common wire including a terminal post and carrying a welding rod clamp, a second wire including a terminal post connected to the plug and having a welding rod clamp on the end of the wire remote from the plug, a skeleton wire frame supported on the bottom of the casing and a rectangular grid mounting said resistance elements upon the frame near the bottom of the casing and adapted to be submerged by liquid therein, said grid constituted by spaced longitudinal and transverse strips, said strips being formed with orifices, rings fitted in said orifices receiving and guiding said resistance elements, a ventilation grill covering part of the open top of the casing, and an imperforate removable dielectric cover closing the remainder of the open top and mounting said fuse sockets and said terminal posts upon the top of the casing, the said welding rod clamp wires extending from the terminal posts.

References Cited

UNITED STATES PATENTS

| | | | |
|---|---|---|---|
| 2,894,113 | 7/1959 | Wakeley | 219—113 X |
| 1,165,451 | 12/1915 | Ruckle | 219—531 |
| 1,442,109 | 1/1923 | Walker | 219—517 |
| 1,608,321 | 11/1926 | Kassteen | 338—231 |
| 2,015,251 | 9/1935 | Browning | 219—517 X |

RICHARD M. WOOD, *Primary Examiner.*

J. G. SMITH, *Assistant Examiner.*